(12) United States Patent
Merchant et al.

(10) Patent No.: US 9,792,170 B2
(45) Date of Patent: Oct. 17, 2017

(54) CORRECTING OPERATIONAL STATE AND INCORPORATING ADDITIONAL DEBUGGING SUPPORT INTO AN ONLINE SYSTEM WITHOUT DISRUPTION

(71) Applicant: CISCO Technology, Inc., San Jose, CA (US)

(72) Inventors: Kashyap Merchant, San Jose, CA (US); Srinivas Pitta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 14/015,433

(22) Filed: Aug. 30, 2013

(65) Prior Publication Data

US 2015/0067391 A1 Mar. 5, 2015

(51) Int. Cl.
*G06F 11/07* (2006.01)

(52) U.S. Cl.
CPC ...... *G06F 11/0793* (2013.01); *G06F 11/0748* (2013.01)

(58) Field of Classification Search
USPC .......................................................... 714/15
See application file for complete search history.

(56) References Cited

U.S. PATENT DOCUMENTS

| | | | |
|---|---|---|---|
| 7,596,721 B1* | 9/2009 | Flake et al. ..................... 714/42 |
| 2004/0153823 A1* | 8/2004 | Ansari ................ G06F 11/0715 |
| | | | 714/38.14 |
| 2005/0183072 A1* | 8/2005 | Horning et al. ............... 717/140 |
| 2009/0183145 A1* | 7/2009 | Hu et al. ........................ 717/168 |
| 2010/0281458 A1* | 11/2010 | Paladino et al. .............. 717/106 |
| 2011/0154109 A1* | 6/2011 | Levine et al. .................. 714/26 |

* cited by examiner

*Primary Examiner* — Kamini Patel
(74) *Attorney, Agent, or Firm* — Patterson + Sheridan, LLP

(57) ABSTRACT

Techniques are provided for correcting the operational state of a multi-process system without disrupting any running processes. A library providing error correction and logging functionality is statically linked to modules in the system. A script in the library loads a package file having a patch for returning an error state to a normal state. The script issues commands to invoke functions in the patch. Once the error state has returned to a normal state, the script issues commands to remove the package file from the system.

20 Claims, 5 Drawing Sheets

US 9,792,170 B2

CORRECTING OPERATIONAL STATE AND INCORPORATING ADDITIONAL DEBUGGING SUPPORT INTO AN ONLINE SYSTEM WITHOUT DISRUPTION

TECHNICAL FIELD

The present disclosure generally relates to computer systems. More specifically, techniques are disclosed for correcting the operational state of a computer system upon which a software application is being executed and collecting debugging information with little or no interruption to the system.

BACKGROUND

Computer systems can perform many operations. In many cases, it is important that the operations run uninterrupted to the extent possible. For example, a network device, such as a switch or a router, may play a critical role in establishing and maintaining connections between nodes in a communications network. Therefore, it is important that the network device remain in operation.

In data centers housing multiple system components (e.g., routers, switches, host servers), numerous software modules run in each component and communicate with different processes. Occasionally, a module residing in a system component fails. For instance, a software bug in the module may cause inter-process communication (IPC) buffers to leak, such that the module is unable to drop IPC messages received (until a buffer overflow occurs resulting in an exception or core dump).

Typically, if a system component in a data center enters into an error state (e.g., due to a software bug), administrators have a limited number of options. One option is that the administrator can restart the process that caused the problem. However, some system products might not support process restarts without rebooting the entire system component. In that case, the administrator reports the issue with the vendor, providing the vendor with logs to allow an engineering team to diagnose and debug the issue. Once the vendor identifies the issue as being caused by a particular module, the vendor can provide a new image or updated version of the module to the administrator. If the vendor provides a new image, the administrator shuts down the system, replaces the image, and reboots the system. If the vendor provides an updated version of the module, the administrator replaces the module before restarting the component. This involves terminating any processes running on the system component. Both options may disrupt the computing environment and also yield unwanted consequences for the environment. This is especially undesired in a large computing environment where the downtime of any component or subsystem can result in long processing delays for other systems in the data center.

Further, in some circumstances, software bugs are difficult to reproduce locally with the vendor, and debugging logs sent by the user can sometimes provide the vendor with insufficient information to diagnose a software bug. For example, after receiving a report from a user, the vendor may request that the user issue commands to a process running inside the system component to help diagnose the problem. When the commands do not yield the desired information or values to aid in diagnosing the bug, the vendor can run a debugger on the live process instead. However, doing so is often disruptive because other system components or subsystems trying to communicate with the process may be unable to do so because of the debugger.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. Note, however, that the appended drawings illustrate only typical embodiments of this disclosure and are therefore not to be considered limiting of its scope, for the disclosure may admit to other equally effective embodiments.

DESCRIPTION

Overview

Figure 1:
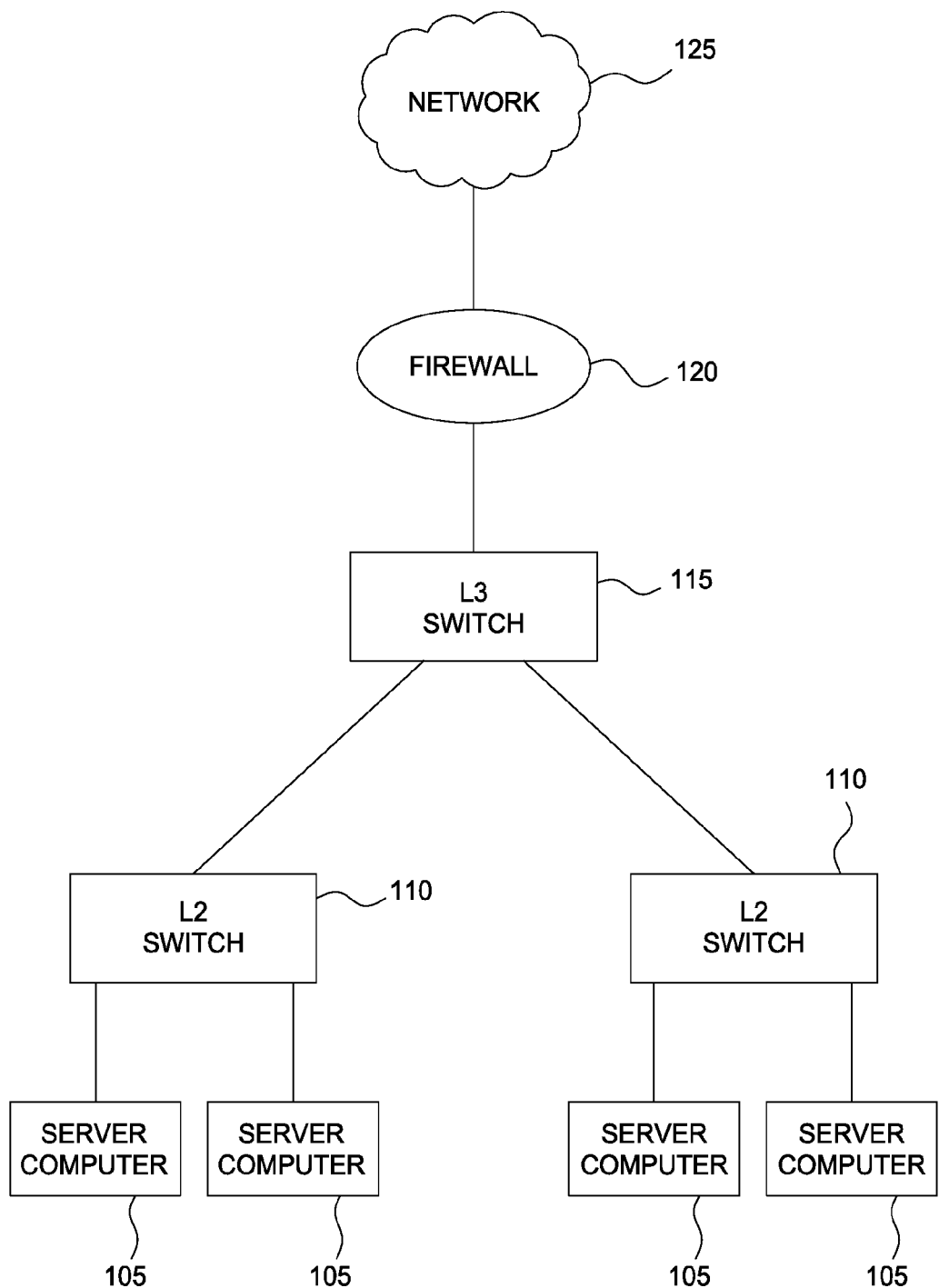
FIG. 1 illustrates an example computing infrastructure, according to one embodiment.

One embodiment presented herein includes a method. The method generally includes loading a package into a system maintaining one or more running processes upon determining that the system is in an error state. The package includes a function that accesses one or more data structure values stored in a memory of the system. Each data structure is controlled by at least one of the running processes. The data structures store one or more values causing the error state. Without terminating any of the one or more running processes, the function is invoked to correct the error state.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DESCRIPTION OF EXAMPLE EMBODIMENTS

Embodiments presented herein provide techniques for correcting an error state of a multi-process system without disruption. More specifically, embodiments provide a mechanism that statically links each process to a common library that has access to global variables of the process. In the event a software bug causes an error state within a particular system configured with the library, and the user of the system component reports the error state to a vendor, the vendor sends a package file that changes the error state by manipulating variables causing the error state. The user loads the package file into the library. A script in the library instantiates the package file within the system. The script invokes the relevant functionality of the file to change the state from an error state to a normal state. Once the state has changed, the script removes the package file from the system. Further, if the vendor has insufficient information from the logs, the vendor can provide a debug package file that, through the library, collects information about the internal state of the system without interrupting any processes. A script within the library invokes functionality of the debug package to add the logs into the system.

Advantageously, embodiments provide an automated approach to correcting the error state of a system without disrupting any currently running processes. If the software issue is immediately ascertainable, the solution package can correct the error state in-memory, remediating the issue without having to restart the system or terminate any running processes. As a result, embodiments may be used in systems and components that do not support system restarts. Additionally, if the cause for the error state is not immediately ascertainable (or if further information is desirable in creating a fix for the underlying problem), the debug package allows the system vendor to extract information from system data structures without interrupting any running processes (e.g., such as through a debugger).

In the following description, numerous specific details are set forth to provide a more thorough understanding of the embodiments. However, it will be apparent to one of skill in the art embodiments of the present disclosure may be practiced without one or more of these specific details. In other instances, well-known features have not been described to avoid obscuring the embodiments.

FIG. 1 illustrates a conceptual diagram of an example user computing infrastructure 100 with systems configured to correct error states without disruption, according to one embodiment. As shown, computing infrastructure 100 may include multiple deployable systems and components manufactured by a vendor and connected to a network 125, such as server computers 105, L2 switches 110, an L3 switch 115, a firewall 120, and others.

On occasion, a system component within computing infrastructure 100 may enter into an error state due to a software bug. For example, an L2 switch 110 may encounter deadlock because of one or more erroneous values being supplied to a module running inside the switch. In a typical situation, the user can report the problem to the vendor of L2 switch 110, and the vendor, upon diagnosing the issue, can send a new image file that remedies the problem. Under this approach, however, the user would be required to terminate any running processes tied to the switch to replace the image. Doing this disrupts the activities of other systems that may be communicating with L2 switches 110.

However, the embodiments disclosed herein allow the user to change the error state to a normal state (i.e., remove the deadlock) without disrupting any running processes. Rather than requiring that the user terminate processes and restart the machine, a mechanism having access to global variables of the system can manipulate certain values to correct the error state of the system. This approach allows the user to continue running system processes and allows the vendor of the system to collect additional diagnosing information to correct the underlying problem in subsequent versions of a module.

To do so, a system or system component is configured with a library that links to software modules running in the system. The library may be used in any system that is able to load new package files (e.g., sent by a vendor) and run scripts that can process the package file data. Further, back-end processes running in the system should be able to accept requests from the front-end to load and deploy packages handled by the library. By handling the package files through the library, the scripts may change the internal state of the system as well as collect further data for debugging purposes.

Figure 2:
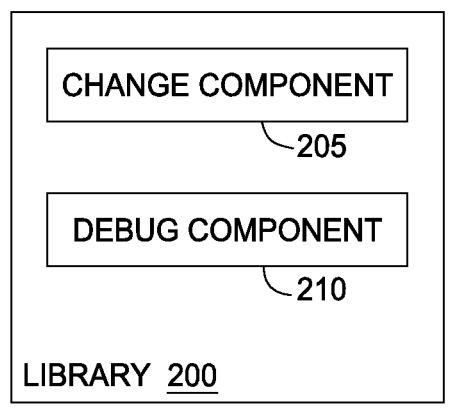
FIG. 2 illustrates a library, in a process context, configured to correct error states in a system and collect information about an internal state of the system, according to one embodiment.

FIG. 2 illustrates a library 200, in a process context, configured to correct an error state within a system and collect information about the internal state of the system, according to one embodiment. Library 200 provides several core functionalities that allow correcting an error state of a system and providing debug logs without disruption system processes. In one embodiment, the library is deployed in the back-end of a system (or component) running multiple processes, such as a router or a switch. Further, all processes, at initialization, statically link to library 200. Library may access global variables within each process and manipulate the variables based on a given package file provided by a vendor. As an example, FIG. 2 depicts a change package component 205 and a debug package component 210. Change package component 205 and debug package component 210 may be provided by a vendor after the user of a system or system component reports an issue. For example, when a system component reaches an error state, the user reports the information to the vendor. Once the vendor has diagnosed the error, the vendor sends change package component 205 to the user that remedies the error state in the system component. Further, the vendor may also send debug package component 210 to the user to collect additional information regarding the internal state of the system. In one embodiment, library 200 may also handle package files having different functionalities from changing the state of the system and logging.

At any rate, library 200 is able to perform error state correction in systems for numerous use cases, such as in draining inter-process communication buffers, generating finite state machine triggers, triggering function callback, modifying global variable state, handling memory leaks, resolving deadlock, modifying persistent storage systems, and restoring persistent storage states. For example, if the error state originates from an incorrect value in a data structure in the persistent storage, change package component 205 is responsible for changing the incorrect value to a correct one.

Further, in some cases, information logs sent by the user to the vendor provide insufficient information to diagnose the reported error state. Alternatively, after the error state has been corrected, the vendor may want additional information to remedy the underlying issue. Library 200, through debug package component 210, provides collection of additional data regarding the internal state of the system. Debug package component 210, upon being invoked, extracts desired values from a data structure. Debug package component 210 provides the functionality to collect values from data structures related to the internal state of the system. Once the vendor has ascertained what values can be used to further diagnose a particular error, the vendor may create and send debug package component 210 to the user.

In one embodiment, to handle error state correction and logging, library 200 uses scripts to issue front-end commands and arguments and invoke functions included in package files. The script files are responsible for incorporating package files in the system, invoking the functionality of the package files, and removing the package files from the system once the package files have been performed. In one embodiment, the script may also pass a list of arguments to existing packages to modify the behavior of the package file based on requirements of a user or vendor. For example, in collecting debugging information from a flash memory module in a router, the vendor of the system may include in debug package component 210 a list of arguments specifying additional data structures from which to retrieve values for logging purposes.

Figure 3:
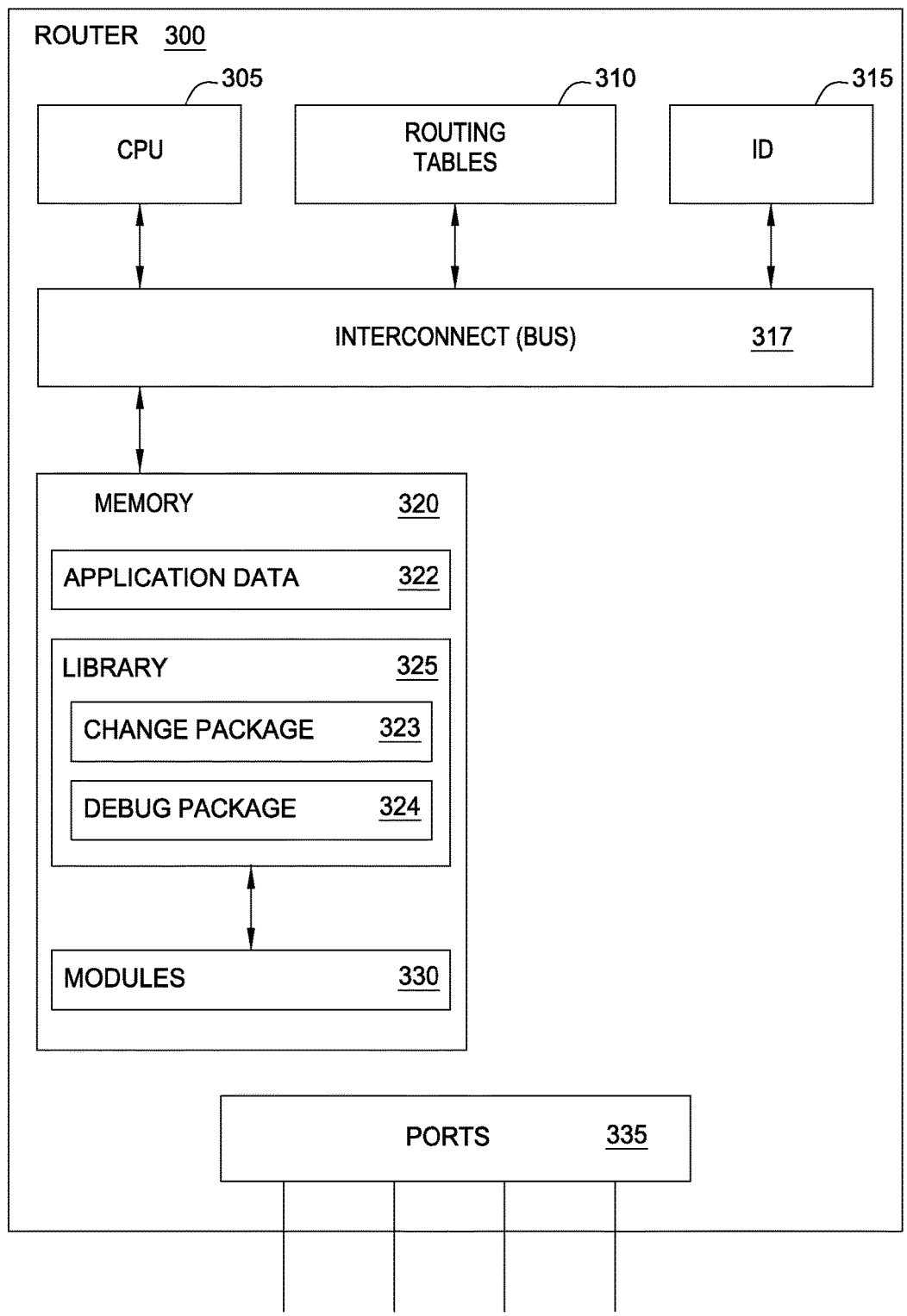
FIG. 3 illustrates an example router device having a process configured with a library that accepts package files in correcting error states and generating debugging logs, according to one embodiment.

FIG. 3 illustrates an example router device 300 having a process and configured with the library described above, according to one embodiment. As stated, the embodiments may apply to any deployable system or system component that is capable of loading package files and running scripts to perform the functions included in the package files.

As shown, router 300 includes, without limitation, a central processing unit (CPU) 305, an identifier 315, a memory 320, and ports 335, each connected to a bus 317. CPU 305 retrieves and executes programming instructions stored in memory 320, as well as stores and retrieves application data 322 and routing tables 310 residing in storage 340. Via bus 317, router 300 transmits programming instructions and application data 322 between CPU 305, identifier 315, memory 320, and ports 335. Note that CPU 305 is included to be representative of a single CPU, multiple CPUs, a single CPU having multiple processing cores, and the like. Memory 320 is included to be generally representative of a random access memory.

Router 300 may include one or more software modules 330 that communicate with the components of router 300. For example, a software module 330 may aid in storing processor information of router 300. As another example, a software module 330 may buffer inter-process communications messages received from other modules. Each software module 330 statically links to library 325 (as depicted in FIG. 3 by the two-way arrow connecting software module 330 to library 325). Library 325 may include change package 323 and debug package 324 sent by a vendor to correct error states in router 300 and provide additional information for debugging purposes. Note that both packages may be removed from library 325 once the functionality of each package has been performed.

Figure 4:
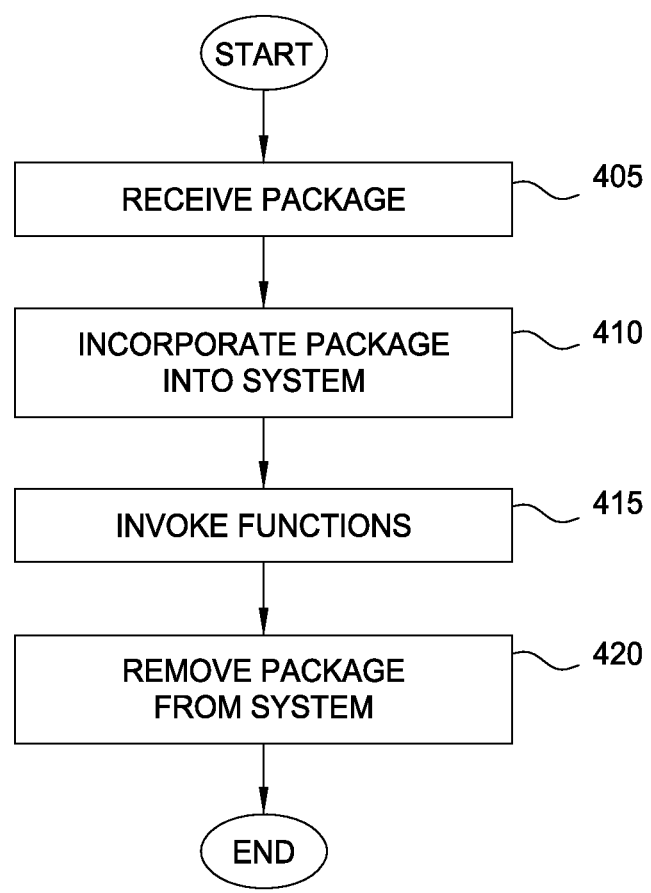
FIG. 4 illustrates a method for handling package files in a system configured with a library within context of a process, according to one embodiment.

FIG. 4 illustrates a method 400 for handling package files in a system configured with the library within context of a process, according to one embodiment. For example, method 400 may apply to a router configured with the library and deployed in a large data center. Assume that the router includes a flash memory module that processes persistent storage data. Further, assume that while the module is running, one of the values reported to the module is incorrect, and as a result, a port failure occurs, causing the router to enter an error state.

The vendor diagnoses the issue based on logs provided by the user. Upon diagnosing the issue, the vendor develops a change package remedying the issue to be run from the library. In the given example, the vendor may diagnose the problem as an erroneous value being provided to a certain data structure within the router. The vendor may create a patch that changes the erroneous value to the correct value. Once created, the vendor sends a package file containing the patch to the user (e.g., via a network), and the user applies the patch to the module via the library.

Method 400 begins at step 405, where the library in the router receives the package file. For example, the user may load the package file into a router. A script residing in the library may issue front-end commands to the system to incorporate the package file (at step 410) in the back-end. At step 415, the script issues further commands to invoke functions contained in the patch file. Continuing the previous example, the functions invoked may change one or more variables within the router to change the internal state of the router from an error state to a normal state.

At step 415, after the system has returned to a normal state, the script removes the package file from the system. Doing so prevents the package file from obstructing any currently running processes in the system. This approach allows the processes to continue running and also further allows the vendor to diagnose the underlying problem causing the error state and develop a less temporary fix for the system.

Method 400 is applicable for any package sent by the vendor. For instance, the library is capable of collecting further information regarding the internal state of the system for debugging. A debug package provided by the vendor may include a file that retrieves certain data structure values to aid in diagnosing a reported issue and repairing in subsequent versions of an image file.

Figure 5:
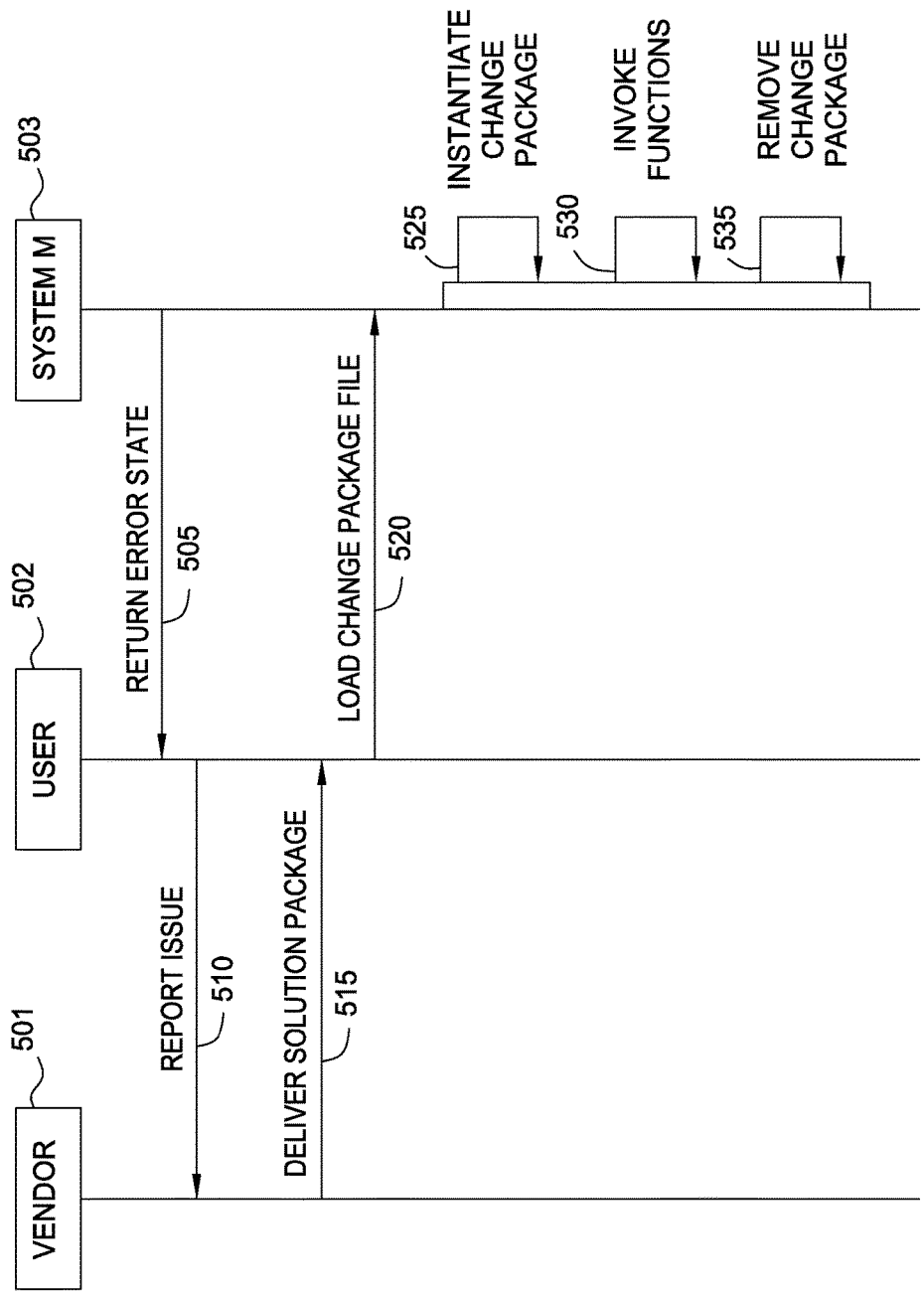
FIG. 5 illustrates a sequence diagram of using a library to correct the internal state of a system, according to one embodiment.

FIG. 5 illustrates a sequence diagram 500 for correcting an error state within a system 503 of a user 502 and manufactured by a vendor 501. At 505, system 503 returns an error state to user 503. The error state can occur as a result of various causes, such a buffer leak caused by a bug in one of the modules running in system 503. During this time, other processes in the computing infrastructure of user 502 may still be running.

At 510, user 503 reports the issue to vendor 501. The report may contain a description of the issue as well as other logs to allow vendor 501 to diagnose the issue. For example, the vendor may diagnose the issue to an incorrect value in a data structure in system 503 causing buffer leaks, leading to the system reporting an error state. Once diagnosed, vendor 501 develops a patch that changes the error state to a normal state. For instance, if the issue is related to an incorrect value in a data structure, the patch resets the value to the correct value. At 515, vendor 501 delivers the package file containing the patch to user 502.

User 502 loads the change package into system 503 (at 520). A script in the library provides commands to the system to incorporate the patch into the system. The script file, invokes functions from the patch to change the state of system 503 from an error state to a normal state (at 525). After the functions have been performed and the state has been corrected, the script issues commands to system 503 remove the change package file from system 503 (at 530). At this point, system 503 may run as intended until vendor 501 develops a patch for the underlying problem causing the error state.

While the foregoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

Although certain embodiments may achieve advantages over other possible solutions and/or over the prior art, whether a particular advantage is achieved by a given embodiment is not limiting. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, embodiments presented herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

In view of the foregoing, the scope of the present disclosure is determined by the claims that follow.

What is claimed is:

1. A computer-implemented method of using a set of loadable functions to facilitate diagnosis and correction of error states of one or more running processes without requiring process termination, the computer-implemented method comprising:
dynamically by operation of one or more computer processors, and without terminating any of the one or more running processes:
upon determining that the one or more running processes are in an error state, loading the set of loadable functions into a library statically linked to the one or more running processes, the set of loadable functions including an initial change function and a debug function;
correcting the error state of the one or more running processes by invoking the initial change function;
extracting diagnostic information of the one or more running processes by invoking the debug function;
loading an updated change function into the library statically linked to the one or more running processes, for invocation in order to further correct the error state of the one or more running processes, wherein the updated change function is based on the extracted diagnostic information; and
for each of at least one of the initial change function, the debug function, and the updated change function, removing the respective function from the library statically linked to the one or more running processes, after the respective function is invoked.

2. The computer-implemented method of claim 1, further comprising sending the extracted diagnostic information to an administrator.

3. The computer-implemented method of claim 1, further comprising, upon loading the debug function into the library statically linked to the one or more running processes, passing one or more arguments to the debug function.

4. The computer-implemented method of claim 3, wherein the one or more arguments modify a behavior of the debug function.

5. The computer-implemented method of claim 1, wherein the extracted diagnostic information is output, wherein the error state comprises draining inter-process communication buffers, wherein the draining inter-process communication buffers are characterized by inter-process communication (IPC) buffers leaking due to failure of a module executing on a network device, such that the module is unable to drop received IPC messages until a buffer overflow occurs resulting in an exception or a core dump, wherein the network device is selected from (i) a network switch and (ii) a network router.

6. The computer-implemented method of claim 5, wherein the library is configured to use a set of scripts to issue front-end commands and arguments to back-end processes to both load and invoke the set of loadable functions.

7. The computer-implemented method of claim 6, wherein the debug function is invoked using a plurality of arguments, each argument specifying a respective data structure of the one or more running processes, wherein the diagnostic information includes a respective value for each specified data structure.

8. The computer-implemented method of claim 7, wherein the debug function, the initial change function, and the updated change functions are removed from the library statically linked to the one or more running processes, in order to prevent obstructing any communication with the one or more running processes as a result of the set of loadable functions being resident in a memory space associated with the one or more running processes.

9. The computer-implemented method of claim 8, wherein each type of error state, selected from (i) draining inter-process communication buffers, (ii) generating finite state machine triggers, (iii) triggering function callback, (iv) modifying global variable state, (v) handling memory leaks, (vi) resolving deadlock, (vii) modifying persistent storage systems, and (viii) restoring persistent storage states, is dynamically corrected based on the set of loadable functions.

10. The computer-implemented method of claim 1, wherein the error state is of a type selected from (i) draining inter-process communication buffers, (ii) generating finite state machine triggers, (iii) triggering function callback, (iv) modifying global variable state, (v) handling memory leaks, (vi) resolving deadlock, (vii) modifying persistent storage systems, and (viii) restoring persistent storage states.

11. The computer-implemented method of claim 1, further comprising:
outputting the extracted diagnostic information.

12. A non-transitory computer-readable medium storing program code executable to perform an operation of using a set of loadable functions to facilitate diagnosis and correction of error states of one or more running processes without requiring process termination, the operation comprising:
dynamically by operation of one or more computer processors when executing the program code, and without terminating any of the one or more running processes:
upon determining that the one or more running processes are in an error state, loading the set of loadable functions into a library statically linked to the one or more running processes, the set of loadable functions including a change function and a debug function;
correcting the error state of the one or more running processes by invoking the change function;
extracting diagnostic information of the one or more running processes by invoking the debug function;
loading an updated change function into the library statically linked to the one or more running processes, for invocation in order to further correct the error state of the one or more running processes, wherein the updated change function is based on the extracted diagnostic information; and
for each of at least one of the initial change function, the debug function, and the updated change function, removing the respective function from the library statically linked to the one or more running processes, after the respective function is invoked.

13. The non-transitory computer-readable medium of claim 12, wherein the operation further comprises sending the extracted diagnostic information to an administrator.

14. The non-transitory computer-readable medium of claim 12, wherein the operation further comprises, upon loading the debug function into the library statically linked to the one or more running processes, passing one or more arguments to the debug function.

15. The non-transitory computer-readable medium of claim 14, wherein the one or more arguments modify a behavior of the debug function.

16. The non-transitory computer-readable medium of claim 12, wherein the error state is of a type selected from (i) draining inter-process communication buffers, (ii) generating finite state machine triggers, (iii) triggering function callback, (iv) modifying global variable state, (v) handling memory leaks, (vi) resolving deadlock, (vii) modifying persistent storage systems, and (viii) restoring persistent storage states.

17. A system of using a set of loadable functions to facilitate diagnosis and correction of error states of one or more running processes without requiring process termination, the system comprising:
one or more computer processors; and
a memory hosting an application which, when executed on the one or more computer processors, performs an operation comprising:
without terminating any of the one or more running processes, dynamically:
upon determining that the one or more running processes are in an error state, loading the set of loadable functions into a library statically linked to the one or more running processes, the set of loadable functions including a change function and a debug function;
correcting the error state of the one or more running processes by invoking the change function;
extracting diagnostic information of the one or more running processes by invoking the debug function;
loading an updated change function into the library statically linked to the one or more running processes, for invocation in order to further correct the error state of the one or more running processes, wherein the updated change function is based on the extracted diagnostic information; and
for each of at least one of the initial change function, the debug function, and the updated change function, removing the respective function from the library statically linked to the one or more running processes, after the respective function is invoked.

18. The system of claim 17, wherein the operation further comprises sending the extracted diagnostic information to an administrator.

19. The system of claim 17, wherein the operation further comprises, upon loading the debug function into the library statically linked to the one or more running processes, passing one or more arguments to the debug function, wherein the one or more arguments modify a behavior of the debug function.

20. The system of claim 17, wherein the error state is of a type selected from (i) draining inter-process communication buffers, (ii) generating finite state machine triggers, (iii) triggering function callback, (iv) modifying global variable state, (v) handling memory leaks, (vi) resolving deadlock, (vii) modifying persistent storage systems, and (viii) restoring persistent storage states.

* * * * *